United States Patent
Han et al.

(10) Patent No.: US 8,155,474 B2
(45) Date of Patent: Apr. 10, 2012

(54) METHOD, MEDIUM, AND SYSTEM COMPENSATING SHADOW AREAS

(75) Inventors: Young-ran Han, Suwon-si (KR); Seung-sin Lee, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1207 days.

(21) Appl. No.: 11/822,729

(22) Filed: Jul. 9, 2007

(65) Prior Publication Data

US 2008/0025635 A1 Jan. 31, 2008

(30) Foreign Application Priority Data

Jul. 31, 2006 (KR) ........................ 10-2006-0072324

(51) Int. Cl.
*G06K 9/40* (2006.01)
*G06K 9/00* (2006.01)
*G03F 3/08* (2006.01)

(52) U.S. Cl. ......... 382/274; 382/167; 382/169; 358/521

(58) Field of Classification Search .......... 382/168–174, 382/274; 345/617, 671, 672, 675; 358/521–522
See application file for complete search history.

(56) References Cited

U.S. PATENT DOCUMENTS

| | | | |
|---|---|---|---|
| 5,132,796 A | 7/1992 | Topper et al. | |
| 5,255,093 A | 10/1993 | Topper et al. | |
| 5,394,195 A | 2/1995 | Herman | |
| 5,581,370 A * | 12/1996 | Fuss et al. | 358/447 |
| 5,715,377 A * | 2/1998 | Fukushima et al. | 358/1.9 |
| 5,724,456 A * | 3/1998 | Boyack et al. | 382/274 |
| 5,822,453 A * | 10/1998 | Lee et al. | 382/169 |
| 5,857,033 A * | 1/1999 | Kim | 382/168 |
| 6,049,626 A * | 4/2000 | Kim | 382/167 |
| 6,414,659 B1 | 7/2002 | Park et al. | |
| 6,493,468 B1 * | 12/2002 | Matsuura | 382/274 |
| 6,735,330 B1 * | 5/2004 | Van Metter et al. | 382/132 |
| 6,975,758 B2 * | 12/2005 | Nicolas | 382/165 |
| 6,990,233 B2 * | 1/2006 | Park et al. | 382/164 |
| 7,013,044 B2 * | 3/2006 | Wang | 382/168 |

(Continued)

FOREIGN PATENT DOCUMENTS

EP 1708490 A1 10/2006

(Continued)

OTHER PUBLICATIONS

Tao, "Adaptive and integrated neighborhood-dependent approach for nonlinear enhancement of color images", Journal of Electronic Imaging 14(4), 043006 (Oct.-Dec. 2005).*

(Continued)

*Primary Examiner* — Andrae S Allison
(74) *Attorney, Agent, or Firm* — Staas & Halsey LLP

(57) ABSTRACT

An image compensating system, medium, and method, including, a shadow area compensating system, medium, and method which may significantly increase the luminance of each pixel in a dark area with respect to pixels positioned in the vicinity of the corresponding pixel and slightly increase the luminance of each pixel in a bright area. The shadow area compensating method includes calculating a representative luminance $L_{av}$ of each pixel having image information by reflecting the luminance of the corresponding pixel and the luminances of pixels positioned in the vicinity of the corresponding pixel, determining a compensation luminance ratio using the calculated representative luminance, and increasing an output luminance on the basis of the compensation luminance ratio.

28 Claims, 9 Drawing Sheets

U.S. PATENT DOCUMENTS

| | | | |
|---|---|---|---|
| 7,340,091 B2 * | 3/2008 | Lin | 382/169 |
| 7,639,893 B2 * | 12/2009 | Duan et al. | 382/274 |
| 7,778,478 B2 | 8/2010 | Kuniba | |
| 2006/0215925 A1 | 9/2006 | Kuniba | |

FOREIGN PATENT DOCUMENTS

| | | |
|---|---|---|
| JP | 2001-034748 | 2/2001 |
| JP | 2004-260835 | 9/2004 |
| JP | 2005-341527 | 12/2005 |
| KR | 10-2001-0092277 | 10/2001 |
| KR | 10-2003-0084198 | 11/2003 |
| KR | 10-2005-0042699 | 5/2005 |
| KR | 10-2005-0122843 | 12/2005 |
| WO | 2005/055588 A1 | 6/2005 |

OTHER PUBLICATIONS

Tao et al "A Robust Image Enhancement Technique for Improving Image Visual Quality in Shadowed Scenes" CIVR 2005, LNCS 3568, pp. 395-404, Springer-Verlag Berlin Heidelberg 2005.*

Japanese Office Action dated Feb. 7, 2012 issued in corresponding Japanese Patent Application No. 2007-193193.

* cited by examiner

|    | G   | T   |
|----|-----|-----|
| H1 | 1.2 | 128 |
| H2 | 1.1 | 64  |
| H3 | 1.4 | 64  |

METHOD, MEDIUM, AND SYSTEM COMPENSATING SHADOW AREAS

CROSS-REFERENCE TO RELATED APPLICATIONS

This application claims priority from Korean Patent Application No. 10-2006-0072324 filed on Jul. 31, 2006 in the Korean Intellectual Property Office, the disclosure of which is incorporated herein by reference in its entirety.

BACKGROUND OF THE INVENTION

1. Field of the Invention

One or more embodiments of the present invention relate to a shadow area compensating system, medium, and method, and more particularly, to shadow area compensating system, medium, and method which that may significantly increase the luminance of each pixel in a dark area with respect to pixels positioned in the vicinity of the corresponding pixel and slightly increase the luminance of each pixel in a bright area.

2. Description of the Related Art

Generally, an image input by an image input device includes a variety of information, including luminance and chrominance information, for example. However, when components of the corresponding luminance signal are uneven or distorted, it is difficult to clearly visually represent an object included in the image. In particular, when the luminance distribution is uneven, it may be difficult for a viewer to distinguish between objects in dark areas of such an image.

In order to overcome such problems, techniques for improving the luminance have been proposed. For example, in U.S. Pat. Nos. 5,132,796 and 5,255,093, the visibility of a shadow area is improved by adjusting the luminance for the entire output image based on an overall luminance of the input image.

In U.S. Pat. No. 5,394,195, the visibility of a shadow area is improved by again compensating the luminance of the entire output image using information on a portion of an input image. Similarly, U.S. Pat. No. 6,414,659 sets forth a technique for improving the visibility of a shadow area by compensating the luminance of an output image according to luminance characteristics of the corresponding display device, regardless of the input signal.

In the above-mentioned techniques for improving luminance characteristics of an output image by compensating the luminance of the input image, the luminances of pixels having the same intensity are respectively improved to the same extent regardless of the brightness levels of differing respective areas in which the pixels are positioned. In addition, the luminances of pixels are improved regardless or whether they correspond to a dark area of a bright area. In addition, systems that compensate the luminance consider only the characteristics of a display device, regardless of the input image, and cannot properly compensate the luminance of a low-luminance image.

In addition to the above, Korean Publication Patent No. 2005-0042699 discusses a technique where a luminance compensating section is determined by dividing an input image into a plurality of macro blocks and micro blocks and a representative luminance of each block is then calculated. Thereafter, the luminances in the determined compensating sections are increased the same extent throughout the respective sections. Even in this technique, the luminances of pixels in a partial area are increased, resulting in the whole luminance not being improved. However, since the same luminance compensation is performed for a plurality of pixels having the same luminance, the luminance of each pixel does not reflect the luminances of pixels positioned in the vicinity of the corresponding pixel.

In addition, in such techniques for overcoming the above-mentioned problems, it is also difficult to implement the same in memory in real time.

SUMMARY OF THE INVENTION

An aspect of one or more embodiments of the present invention is to provide a technique for realizing a clear image by improving the luminance of each pixel based on information obtained from a corresponding pixel and pixels positioned in the vicinity of the corresponding pixel.

Another aspect of one or more embodiments of the present invention is to provide a technique for preventing undesired increases in luminance by defining the extents to which the luminances of a plurality of pixels having the same luminance (intensity) are increased differently such that luminance values in areas outside of a shadow area are maintained and luminance values within the shadow area are modified, thereby avoiding potentially partially distorting the non-shadow areas.

Still another aspect of one or more embodiments of the present invention is to provide a technique for determining the brightness pattern of the whole image using a histogram and increasing the luminance in a dark area by an exponential curve using T- and G-parameters.

Additional aspects and/or advantages of the invention will be set forth in part in the description which follows and, in part, will be apparent from the description, or may be learned by practice of the invention.

To achieve the above and/or other aspects and advantage, embodiments of the present invention include an image compensating method, including calculating a representative luminance for each pixel of an image based on a luminance of a corresponding pixel and luminances of pixels positioned in a vicinity of the corresponding pixel, determining a compensation luminance ratio using the calculated representative luminance, and increasing an output luminance of at least the corresponding pixel based on the compensation luminance ratio, wherein, the compensation luminance ratio decreases as the representative luminance increases.

To achieve the above and/or other aspects and advantage, embodiments of the present invention include an image compensating method, including calculating a representative luminance for each pixel of an image based on a luminance of a corresponding pixel and luminances of pixels positioned in a vicinity of the corresponding pixel, calculating an adaptive luminance by correlating the representative luminance with an exponential curve, determining a compensation luminance ratio using the calculated adaptive luminance, and increasing an output luminance of at least the corresponding pixel based on the compensation luminance ratio, wherein, the compensation luminance ratio decreases as the representative luminance increases.

To achieve the above and/or other aspects and advantage, embodiments of the present invention include at least one medium including computer readable code to control at least one processing element to implement an embodiment of the present invention.

To achieve the above and/or other aspects and advantage, embodiments of the present invention include an image compensating system, including a representative luminance calculating unit to calculate a representative luminance for each pixel of an image based on a luminance of a corresponding pixel and luminances of pixels positioned in a vicinity of the corresponding pixel, a compensation luminance ratio determining unit to determine a compensation luminance ratio using the calculated representative luminance; and a shadow compensating unit to increase an output luminance of at least the corresponding pixel based on the compensation luminance ratio, wherein, the compensation luminance ratio decreases as the representative luminance is increases.

To achieve the above and/or other aspects and advantage, embodiments of the present invention include an image compensating system, including a representative luminance calculating unit to calculate a representative luminance for each pixel of an image based on a luminance of a corresponding pixel and luminances of pixels positioned in a vicinity of the corresponding pixel, an adaptive luminance calculating unit to calculate an adaptive luminance by correlating the representative luminance with an exponential curve, a compensation luminance ratio determining unit to determine a compensation luminance ratio using the calculated adaptive luminance, and a shadow compensating unit to increase an output luminance of at least the corresponding pixel based on the compensation luminance ratio, wherein, the compensation luminance ratio decreases as the representative luminance is increases.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
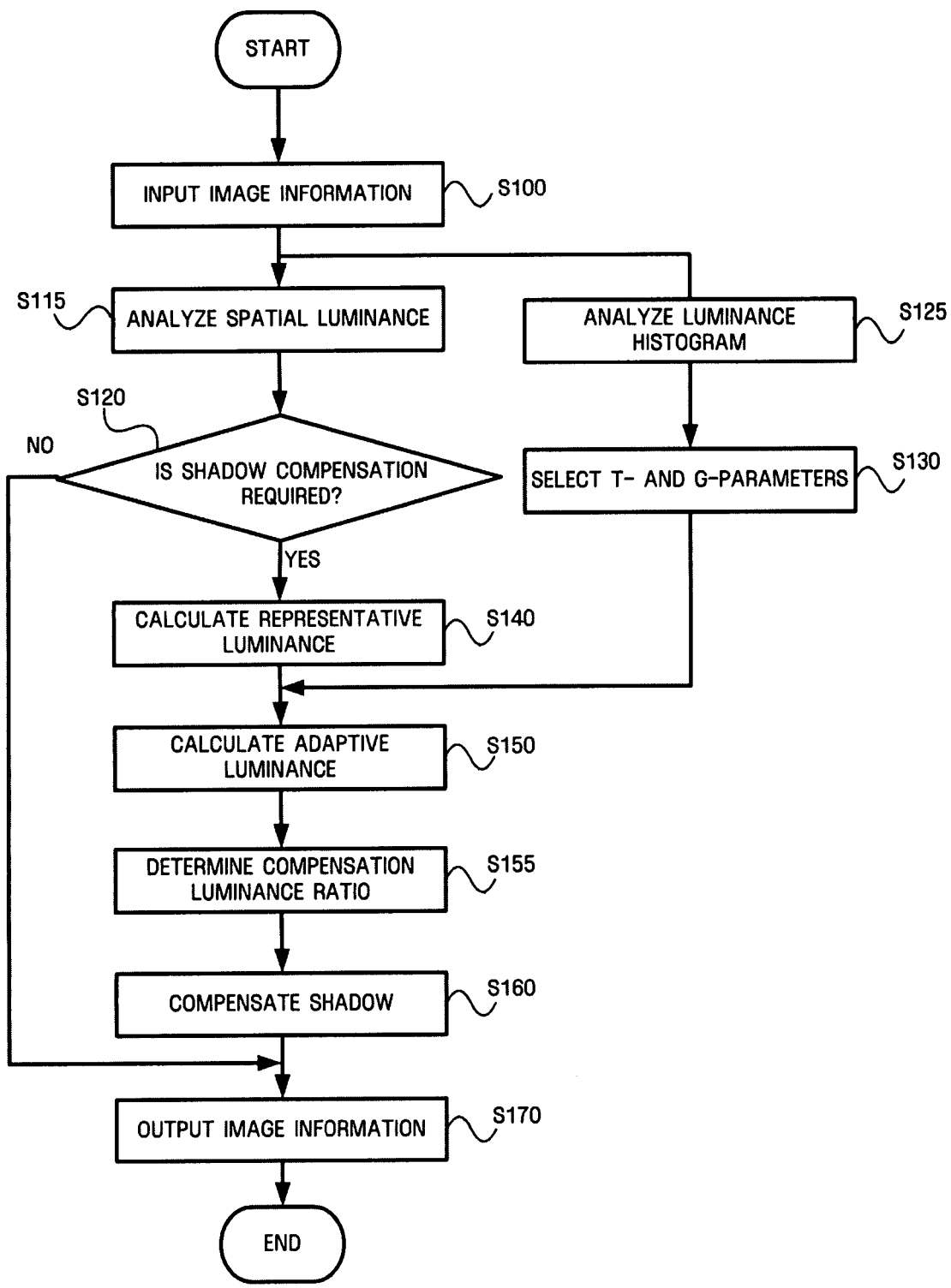
FIG. 1 illustrates a shadow area compensating method, according to an embodiment of the invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a shadow area compensating method, according to an embodiment of the invention.

The shadow area compensating method may include receiving image information, in operation S100, performing spatial luminance analysis, in operation S115, calculating a representative luminance, in operation S140, determining a compensation luminance ratio, in operation S155, compensating a shadow area, in operation S160, and outputting image information, in operation S170.

As shown in FIG. 1, image information may be input in operation S100, and may include data on the color of every pixel, for example.

When the input image information is analyzed, the spatial luminance of one image or a corresponding frame may be calculated, in operation S115. Here, the input image or a corresponding frame may be divided into a plurality of regions, and an average luminance of the divided regions may be calculated. In this spatial luminance analysis, when the average luminance of the divided regions is lower than a threshold luminance, it may be determined that a shadow portion exists in the corresponding image or the corresponding region and that improvement of the luminance is desirable.

Figure 2:
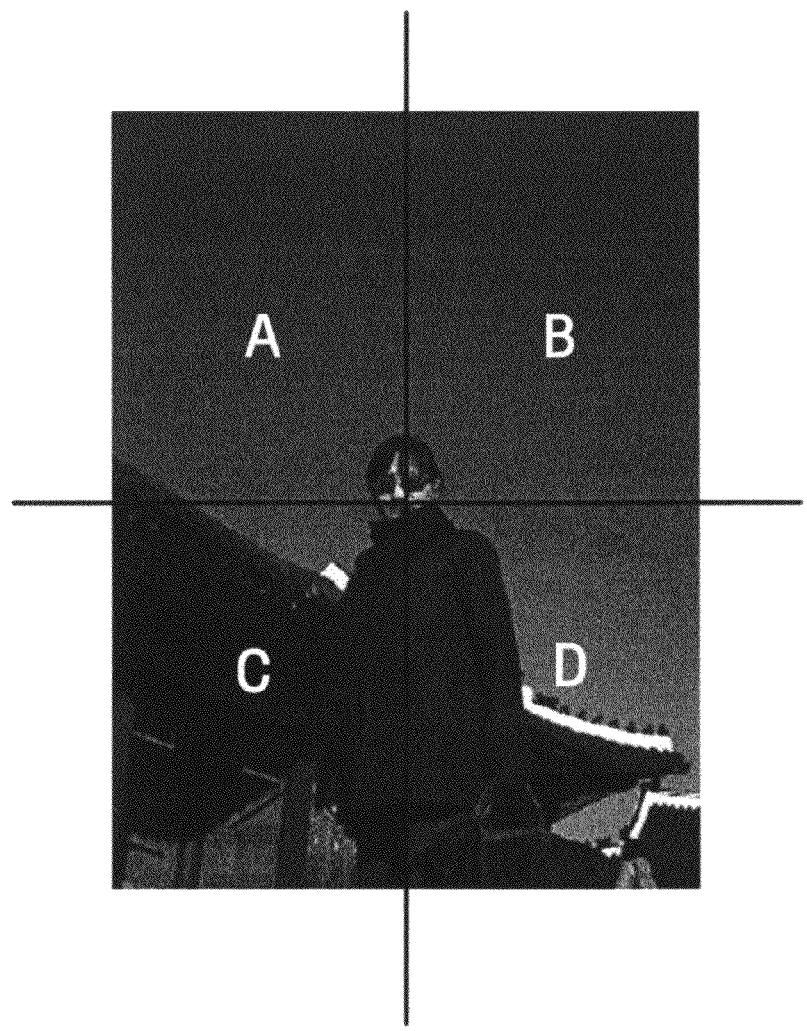
FIG. 2 illustrates an image that is divided for a spatial luminance in a shadow area compensating method, according to an embodiment of the invention.

FIG. 2 illustrates an image that has been divided for a spatial luminance in a shadow area compensating method, according to an embodiment of the invention. As shown in FIG. 2, as only an example, when an image is divided into four regions, A, B, C, and D, the spatial luminances, that is, the average luminances of the divided regions can each be calculated. When at least one of the four calculated average luminances is lower than the threshold luminance, it may be determined that improvement of the luminance of the corresponding image is desirable. As an example, the threshold luminance may be predetermined or designated by a user. Here, improvement of the luminance may be desirable because luminance levels lower than the threshold luminance may result in deteriorated visibility.

In the above description, one image may be divided into four regions, as only an example, and one image may also be divided into several first regions and then divided into several different second regions that overlap the first regions. After division, the average luminances of the individual divided regions may be calculated. When at least one of the average luminances of the divided regions is lower than the threshold luminance, a shadow compensating process, which will be described further below, may be performed. Meanwhile, according to one embodiment, when all of the average luminances of the divided regions are equal to or higher than the threshold luminance, the shadow compensating process may not even be performed.

When it is determined that it is desired to improve the luminance, a representative luminance $L_{av}$ may be calculated while scanning the pixels in the corresponding region, in operation S140. The representative luminance represents the luminance of a pixel as luminance information on a local portion of the image including the corresponding pixel. This is used to express the image information corresponding to a pixel by a value representative of the luminance of the corresponding pixel considering not only the information on the corresponding pixel but also the information of the surrounding pixels. For example, the representative luminance may be obtained by calculating the average of the luminances of a pixel and pixels surrounding the corresponding pixel.

Figure 3:
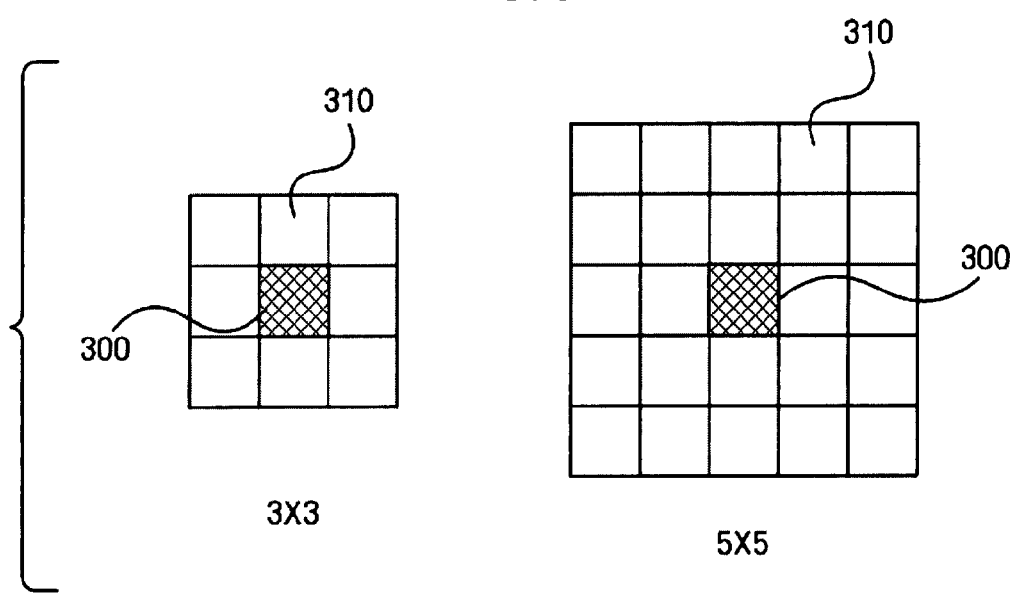
FIG. 3 illustrates examples of a pixel array that may be used for obtaining the average luminance in a shadow area compensating method, according to an embodiment of the invention.

FIG. 3 illustrates examples of a pixel array that may be used for obtaining the average luminance in a shadow area compensating method, according to an embodiment of the invention. As shown in FIG. 3, the representative luminance of a pixel 300 may be calculated by averaging the luminances of surrounding pixels 310, e.g., surrounding the pixel 300 in a three-by-three pixel region or a five-by-five pixel region. Alternatively, the representative luminance of a pixel may be obtained by assigning weights to the luminances of pixels surrounding the corresponding pixel in a predetermined region, for example, a three-by-three pixel region or a five-by-five pixel region with the corresponding pixel as the center and considering the distances from the corresponding pixel.

In another method of calculating the representative luminance, a grouping of a corresponding pixel may be performed for a region which has each corresponding pixel as the center and from which an adaptive luminance will be calculated, using the below Equation 1, for example. In particular, luminance differences between a corresponding pixel and the surrounding pixels may be calculated, and if the calculated luminance difference is more than a predetermined threshold value α, for example, the corresponding pixel can be classified into a group b1. If not, the corresponding pixel may be classified into a group b2.

$$\text{if}(P_i - P_c) > \alpha \text{ then } P_i \in \{b1\}$$

$$\text{if}(P_i - P_c) \leq \alpha \text{ then } P_i \in \{b2\} \quad \text{Equation 1}$$

Here, Pi represents the luminance of one pixel positioned in the vicinity of the corresponding pixel and Pc is the luminance of the corresponding pixel for calculating the representative luminance.

After classifying the corresponding pixels into the groups b1 and b2, for example, the luminances of the pixels of one of the groups b1 and b2 finally having the greatest number of pixels may be averaged, thereby obtaining the representative luminance for the corresponding pixel.

As described above, in order to obtain the representative luminance of the corresponding pixel 300, luminances of the pixels 310 positioned in the vicinity of the pixel 300 can be referenced. Various methods of calculating the representative luminance of a pixel using luminances of pixels positioned in the vicinity of the corresponding pixel can be used through differing embodiments of the present invention.

After obtaining the representative luminance, when an input pixel is positioned in a shadow area with a low luminance, luminance correction for improving the luminance of the corresponding pixel may be performed, in operation S160. In order to perform such luminance correction, a compensation luminance ratio may be calculated using the below Equations 2 and 3, in operation S155, for example.

$$Y = \left( \frac{I_{N(x,y)}}{\frac{I_{(x,y)}}{L_{av}} + 1} \right) \left( 1 - \frac{I_{N(x,y)}}{\frac{I_{(x,y)}}{L_{av}} + 1} \right) + I_{N(x,y)}^2 \quad \text{Equation 2}$$

Here, if $(Y > I_{N(x,y)})$ then $Y = I_{N(x,y)}$ $$I' = \frac{I_{N(x,y)}}{Y} \cdot I_{(x,y)} \quad \text{Equation 3}$$

Here, $I_{N(x, y)}$ may represent a normalized value of the luminance of a pixel positioned at the coordinates (x, y) of the input image, $I_{(x, y)}$ may represent the luminance of the pixel positioned at the coordinates (x, y), and I' may represent the luminance of the pixel output by the above Equations 2 and 3.

Here, Y represents an improved luminance ratio and $I_{N(x, y)}/Y$ represents a compensation luminance ratio.

Equation 2 may be used to calculate the improved luminance ratio Y using $I_{(x, y)}$ and $L_{av}$. In Equation 2, when the input luminance of the corresponding pixel is high, Y is larger than $I_{N(x,y)}$. When Y is larger than $I_{N(x,y)}$, Y is set to IN(x, y), and thus it is possible to prevent an unintentional miss-operation of Equation 3.

As shown in Equation 3, the luminance of the output pixel compensating a shadow may be obtained by multiplying the compensation luminance ratio $I_{N(x, y)}/Y$ by the luminance of the corresponding input pixel. In this case, when the compensation luminance ratio $I_{N(x, y)}/Y$ is less than 1, the luminance of the output pixel is lowered, while when the compensation luminance ratio $I_{N(x, y)}/Y$ is more than 1, the luminance of the output pixel is increased.

When the compensation luminance ratio $I_{N(x, y)}/Y$ is more than 1, the luminance of the output pixel is greater than the luminance of the input pixel. In other words, when the luminance ratio Y obtained by Equation 2 is less than the normalized luminance $I_{N(x, y)}$ of the input pixel, the luminance of the output pixel has been increased. When the luminance of the input pixel is low, the representative luminance $L_{av}$ becomes low and thus Y becomes low. Therefore, the luminance I' of the output pixel can be increased by multiplying the reciprocal of Y by the luminance of the input pixel.

According to Equations 2 and 3, when the representative luminance and the luminance of the input pixel are high, the compensation luminance ratio $I_{N(x, y)}/Y$ is appropriately 1, and thus the output luminance of the corresponding pixel may not be increased. However, since the compensation luminance ratio $I_{N(x, y)}/Y$ in a low luminance region is greater than 1, the luminance I' of the pixel output may be relatively increased. In other words, the higher the representative luminance is, the less the compensation luminance ratio is. In addition, the minimum value of the compensation luminance ratio may be 1. Therefore, in a bright region with a high representative luminance, the luminance may be slightly or rarely increased.

Accordingly, the representative luminance may be calculated in this way, in operation S140. Based on the calculated representative luminance, the compensation luminance ratio may be determined, in operation S155. The luminance of the input pixel can be multiplied by the compensation luminance ratio, thereby compensating a shadow area, in operation S160. Accordingly, a process for compensating for the shadow region may be performed on each pixel so that the pixels have different luminances. On the whole, a luminance improving process may be performed on pixels with high luminances while not performed on pixels with low luminances. Therefore, in one embodiment, an image whose pixels have been subjected to such a shadow compensating process may be output by an output unit, in operation S170.

Here, when the representative luminance is introduced, selective modification of the luminance of the output pixel can be determined by considering the luminance of the corresponding pixel and the luminances of the pixels positioned in the vicinity of the corresponding pixel. Therefore, even though luminances of a plurality of pixels may be equal to the luminance of the corresponding pixel, at the time when the image is input, the representative luminances of the corresponding pixels may actually be determined to be different from one another, resulting in the luminances of the corresponding pixels output potentially being different from one another. In other words, even though a plurality of pixels have the same luminance, when the calculated representative luminances are different from one another the luminance of a pixel with a relatively low representative luminance may be increased to a greater extent and the luminance of a pixel with a relatively high representative luminance may be increased to a lesser extent.

Even when a plurality of pixels in the same region have the same luminance, and the representative luminance of each pixel is calculated, the representative luminance of a pixel positioned at the boundary of the region may be different from the representative luminance of the pixel positioned at the center of the region. Therefore, even in a region including a plurality of pixels with the same luminance, the luminances of individual pixels may be differently compensated.

As described above, even though an image includes a plurality of pixels having low luminances, when the luminances of the pixels are interpreted into the representative luminances and a shadow compensating process is performed, the luminances of the pixels can be differently compensated and the extent to which the luminance is compensated to increase or lower depends on the representative luminance, thereby making the output image clear and natural.

Accordingly, a shadow area compensating method, according to an embodiment of the invention, may include receiving image information, in operation S100, performing spatial luminance analysis, in operation S115, calculating a representative luminance, in operation S140, determining a compensation luminance ratio, in operation S155, compensating a shadow, in operation S160, outputting image information, in operation S170, analyzing a luminance histogram in operation S125, selecting T- and G-parameters, in operation S130, and calculating an adaptive luminance, in operation S160.

Some processes, except for the analyzing of the luminance histogram of operation S125, selecting of the T- and G-parameters in operation S130, and calculating of the adaptive luminance in operation S160, have already been described above in detail, and thus further description thereof will be omitted.

A luminance histogram with respect to the input image information may created while scanning all the pixels of the image or the corresponding frame, in operation S125. The luminance histogram represents a luminance distribution for pixels of the input image. That is, the luminance histogram can represent a value and a range of distribution of bright points and dark points of one image. Here, the luminance histogram provides for an easy understanding of the whole image and, thus, may be used for improving the luminance. In one embodiment, since the luminance histogram is created while scanning all the pixels of the corresponding image or frame, the luminance histogram creation can be performed at the same time as the spatial luminance analysis, in operation S115.

In the analyzing of the luminance histogram analysis, in operation S125, information on the luminances of the pixels of the input image information may be received, and the number of corresponding pixels counted. For example, when a luminance distribution is represented by 8 bits, each pixel can have any of luminances of 0 to 255. Therefore, the luminances of the pixels of the corresponding image are calculated or read and the corresponding number of pixels counted.

Figure 4:
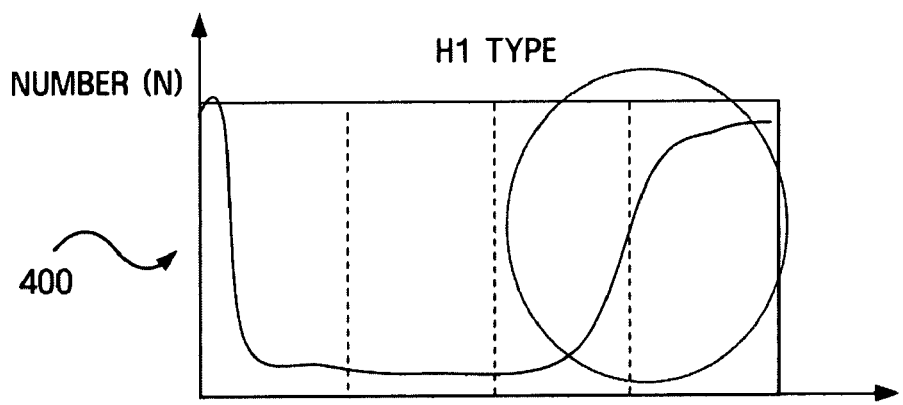
FIG. 4 illustrates example luminance types, classified by luminance histogram analysis, in a shadow area compensating method, according to an embodiment of the invention.
Figure 4:
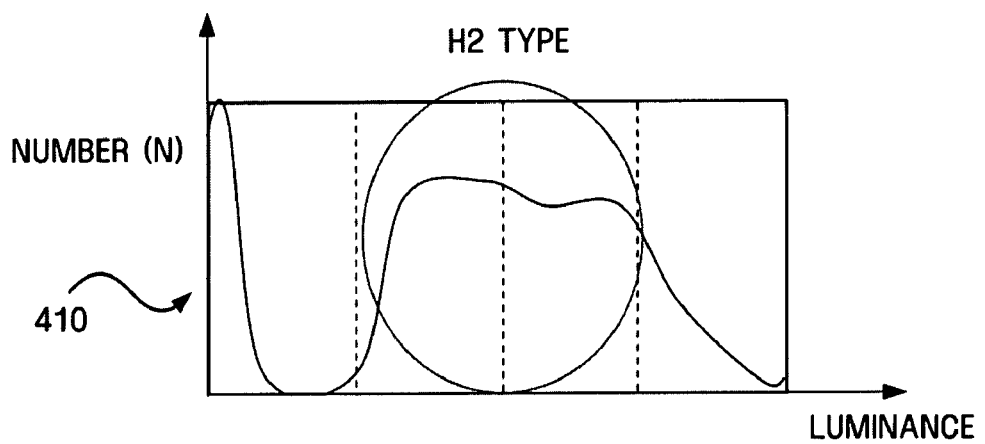
Figure 4:
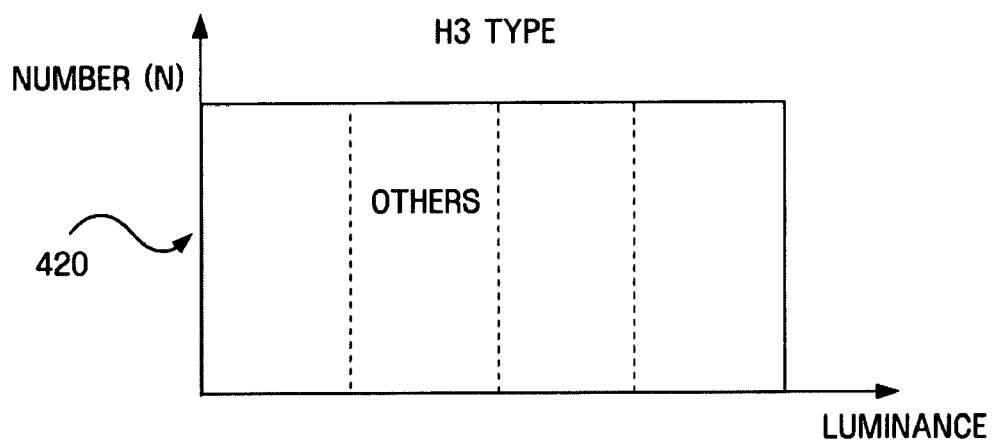

FIG. 4 illustrates three example luminance type diagrams classified by such a luminance histogram analysis in a shadow area compensating method, according to an embodiment of the invention.

After analyzing the luminance histograms, the analyzed luminance histograms can be classified into at least one type, for example. Thus, in one embodiment, as shown in FIG. 4, the luminance histograms can be classified into three types.

Referring to FIG. 4, an H1 type diagram 400 corresponds to an image in which some dark regions exist and most of the regions are bright. When the histogram of the image corresponds to an H2 type diagram 410, some dark regions exist and regions having luminances higher than an intermediate luminance are uniformly distributed.

In this embodiment, for all other cases, the histogram may be considered as corresponding to an H3 type diagram 420. In the H1 type, there are a majority of bright pixels, while in the H2 type, a majority of the pixels have an intermediate luminance. The H3 type, exempting these H1 and H2 type cases, means at least the case in which there are majority of low-luminance, i.e., dark, pixels.

The classifying of the histogram types may be used for selecting T- and G-parameters, which will be further described below. Therefore, in order to select the T- and G-parameters more precisely, histograms may also be classified into more various and detailed categories. In addition, in order to more precisely control the luminance improvement of a shadow area, histograms, particularly, histograms in which dark regions are in the majority, can be classified into more various and detailed categories.

In the selecting of the T- and G-parameters, the T- and G-parameters can be selected according to the determined type of histogram, in operation S130. For example, as shown in FIG. 4, the values of the T- and G-parameters are given to pixels having 8-bit image information according to the type of histogram. In an embodiment, the values of the T- and G-parameters are not fixed, but may be selectively changed or defined depending on application.

Using the given T- and G-parameters, an adaptive luminance $L_{ad}$ can be calculated by the following below Equation 4, in operation S150, for example.

$$\text{if } (L_{av} < T) \qquad \qquad \text{Equation 4}$$
$$L_{ad} = \left(\frac{L_{av}}{T-1}\right)^G (T-1)$$
$$\text{else}$$
$$L_{ad} = L_{av}$$

Here, T and G are parameters are selected according to the type of histogram representing the input image information, and $L_{ad}$ is an adaptive luminance.

When the representative luminance $L_{av}$ is less than the T-parameter value, the adaptive luminance may be calculated from Equation 4. The calculated adaptive luminance may be more or less than the representative luminance according to the G-parameter value. Generally, when G is more than 1, the calculated adaptive luminance is less than the representative luminance.

In Equation 4, T represents a range in which an exponential curve is applied, and G represents the extent to the curve in the range in which the exponential curve is applied.

Figures 5A, 5B:
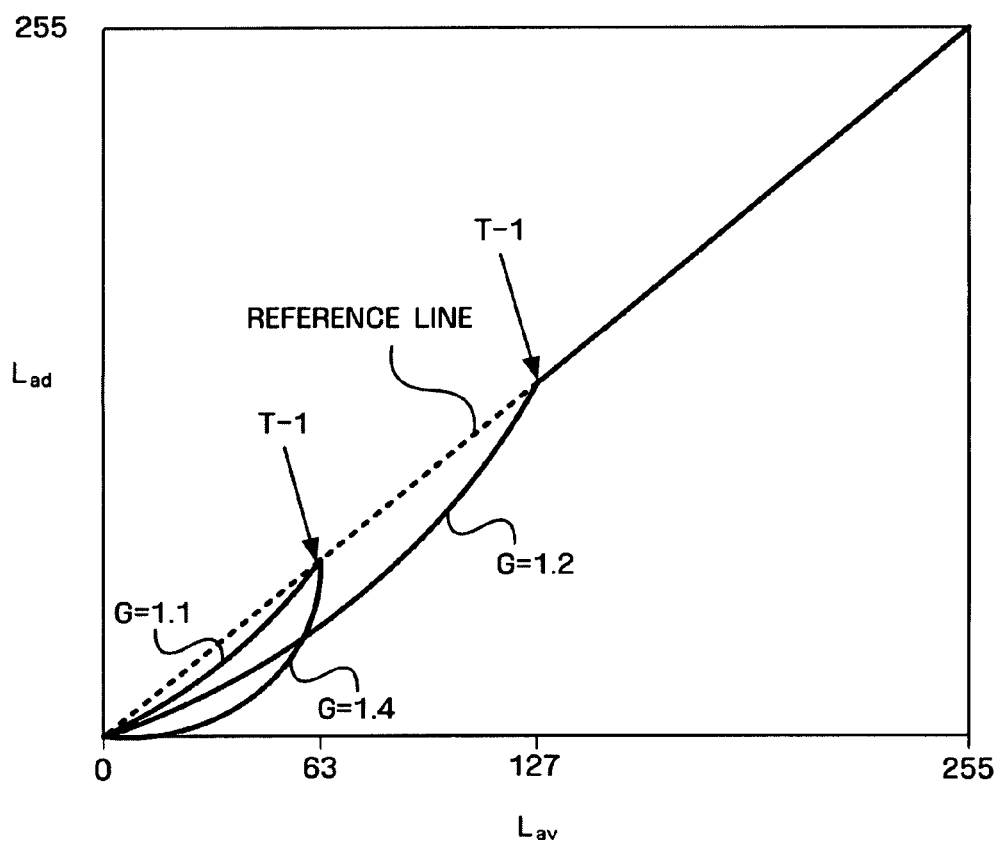
FIG. 5A illustrates a table representing T- and G-parameters for the luminance types classified by FIG. 4 in a shadow area compensating method, according to an embodiment of the invention.
FIG. 5B illustrates an exponential curve based on the T- and G-parameters selected by FIG. 5A in a shadow area compensating method, according to an embodiment of the invention.

FIG. 5A shows a table representing the T- and G-parameters according to the types shown in FIG. 4 in a shadow area compensating method, according to an embodiment of the invention. For example, in the H1 type representation in FIG. 5A, when T is 128, the exponential curve of Equation 4 is applied to the representative luminances $L_{av}$ of 0 to 127, and when G is 1.2, the exponential curve is convex downward. Therefore, in a luminance range of 0 to 127, the adaptive luminance is relatively less than the input representative luminance $L_{av}$. Therefore, shadow correction for relatively improving the luminance can be performed on the pixels having the representative luminances in such a range.

FIG. 5B illustrates the exponential curve based on the T- and G-parameters selected by FIG. 5A in a shadow area compensating method, according to an embodiment of the invention. As shown in FIG. 5B, when the T- and G-parameters are selected, an exponential curve corresponding to the T- and G-parameters can be obtained. Such an exponential curve is a curve representing the ratio of input to output and is a graph of Equation 4. In this graph, the input is the representative luminance $L_{av}$ and the output is the adaptive luminance $L_{ad}$.

When the input is equal to the output, the graph becomes a reference line y (output)=x (input), in which the gradient is 1. When the output is relatively less than the input, the exponential curve is positioned below the reference line y (output)=x (input).

The representative luminance is an appropriate luminance of the pixel obtained by averaging the luminance of the corresponding pixel and the luminances of the pixels positioned in the vicinity of the corresponding pixel or by reflecting the luminances of the pixels positioned in the vicinity of the corresponding pixel in the luminance of the corresponding pixel. The representative luminance calculated in this way can be substituted into Equation 4, thereby obtaining an adaptive luminance, which is less than the representative luminance in a low-luminance region. This can induce a relatively high luminance increasing with respect to a low-luminance region when shadow correction, which will be described below, is performed.

For example, when an image is classified into any one of three types, that is, the H1 type, the H2 type, and the H3 type, based of the image histogram, and the T- and G-parameters are selected as in FIG. 5A according to the type of image, the exponential curve for Equation 4 can be drawn as shown in FIG. 5B.

As shown in FIG. 5B, according to the exponential curve obtained by the T- and G-parameters, in a region in which the representative luminance is low, the adaptive luminance is lower than the representative luminance, and in a region in which the representative luminance is high, the adaptive luminance may be equal to the representative luminance.

The operations of the T- and G-parameters in such H1, H2, and H3 types will be described in greater detail below.

In the H1 type, the T- and G-parameters can be used to calculate the adaptive luminance with respect to a wide low-luminance region by exponentiation with an intermediate exponent. This is available because, when a dark region is made excessively bright, noise boosting can excessively rise. In the H2 type, since the image includes a dark region but is bright on the whole, a low region to be subjected to the shadow correction is set to a narrow region (T is set to a small value) and the exponent is set to a small value (G is set to a small value). In the H3 type, since the image requires a relatively large amount of shadow correction, in order to improve the luminance of a dark region, T is set to a small value and G is set to a large value. Then, the adaptive luminance is calculated.

In an embodiment, the T- and G-parameter values are not fixed, but may be changed or defined based upon differing applications.

When the analyzing of the luminance histogram is not performed or when the type is not accurately determined even though the analyzing of the luminance histogram has been performed, predetermined T- and G-parameter values may be used, for example.

The luminance of the input pixel may be modified using the calculated adaptive luminance, and the resultant compensated luminance output, in operations S160 and S170. Equations for calculating the shadow correction, e.g., Equations 5 and 3, can be induced by substituting the adaptive luminance $L_{ad}$ for the representative luminance $L_{av}$ in Equations 2 and 3.

$$Y = \left(\frac{I_{N(x,y)}}{\frac{I_{(x,y)}}{L_{ad}}+1}\right)\left(1 - \frac{I_{N(x,y)}}{\frac{I_{(x,y)}}{L_{ad}}+1}\right) + I_{N(x,y)}^2 \quad \text{Equation 5}$$

Here, if $(Y > I_{N(x,y)})$ then $Y = I_{N(x,y)}$.

The adaptive luminance may be calculated by the above Equation 4 and the exponential curve using the T- and G-parameters, in operation S150. The compensation luminance ratio can be calculated by substituting the calculated adaptive luminance into Equations 5 and 3, in operation S155. Then, the corrected output luminance I' of the corresponding pixel may be obtained by multiplying the luminance of the input pixel by the compensation luminance ratio, in operation S160.

According to Equations 5 and 3, when the luminance of the input pixel and the adaptive luminance are high, the compensation luminance ratio $I_{N(x,y)}/Y$ is appropriately 1 and thus the output luminance of the corresponding pixel may not be increased. However, when the luminance of the input pixel and the adaptive luminance are low, the compensation luminance ratio $I_{N(x,y)}/Y$ is more than 1 and thus the output luminance I' of the corresponding pixel may be relatively increased. In other words, as the adaptive luminance increases, the compensation luminance ratio decreases.

Figure 6:
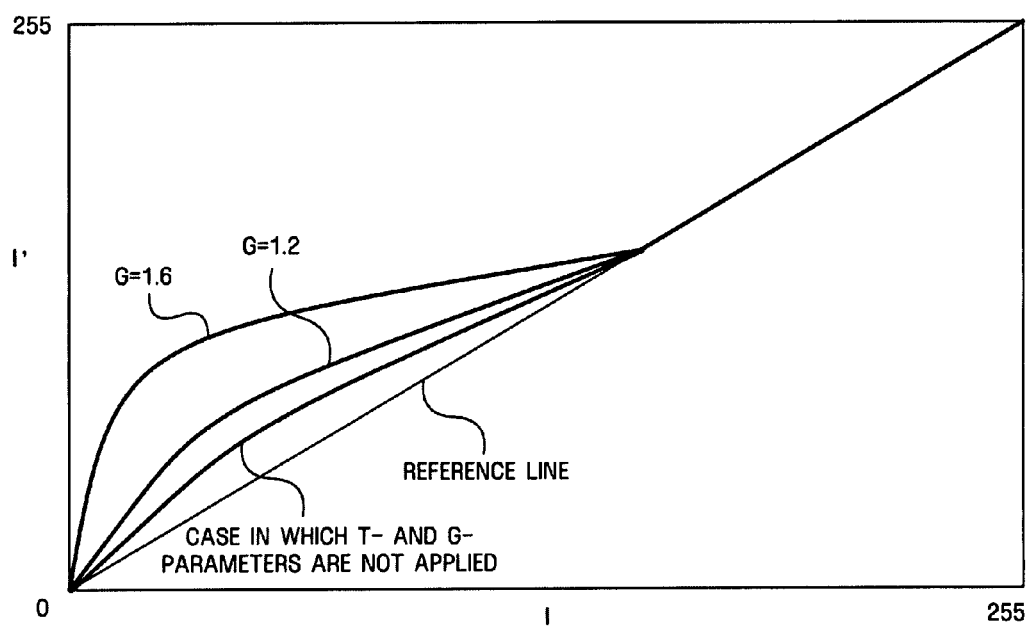
FIG. 6 illustrates shadow compensating results when T- and G-parameters are used and when T- and G-parameters are not used in a shadow area compensating method, according to an embodiment of the invention.

FIG. 6 illustrates the shadow compensating results when T- and G-parameters are used and when T- and G-parameters are not used in a shadow area compensating method, according to an embodiment of the invention.

As shown in this embodiment, when a histogram is not applied, the output luminance for the input luminance can be observed using the representative luminance without calculating the adaptive luminance. Even though the exponential curve according to the T- and G-parameters is not applied, in a region in which the representative luminance obtained from Equations 2 and 3 is low, the luminance is considerably increased. However, in a region in which the representative luminance is high, the luminance is rarely increased. Therefore, the luminance improvement in a shadow region having low luminance can be achieved.

When the exponential curve according to the T- and G-parameters is applied, the adaptive luminance is substituted into Equations 5 and 3 and the output luminance for the input luminance can be observed. When the adaptive luminance is made to be lower from the representative luminance as G increases, the luminance becomes considerably increased. Therefore, it is apparent that, as G increases, the output luminance of the corresponding pixel increases. Even though the histogram method is applied, in a high-luminance region, the luminance is not increased or is rarely increased. However, in a region in which the input luminances of the pixels are low, the luminance is considerably increased. Therefore, a dark region can become relatively bright.

Figure 7A:
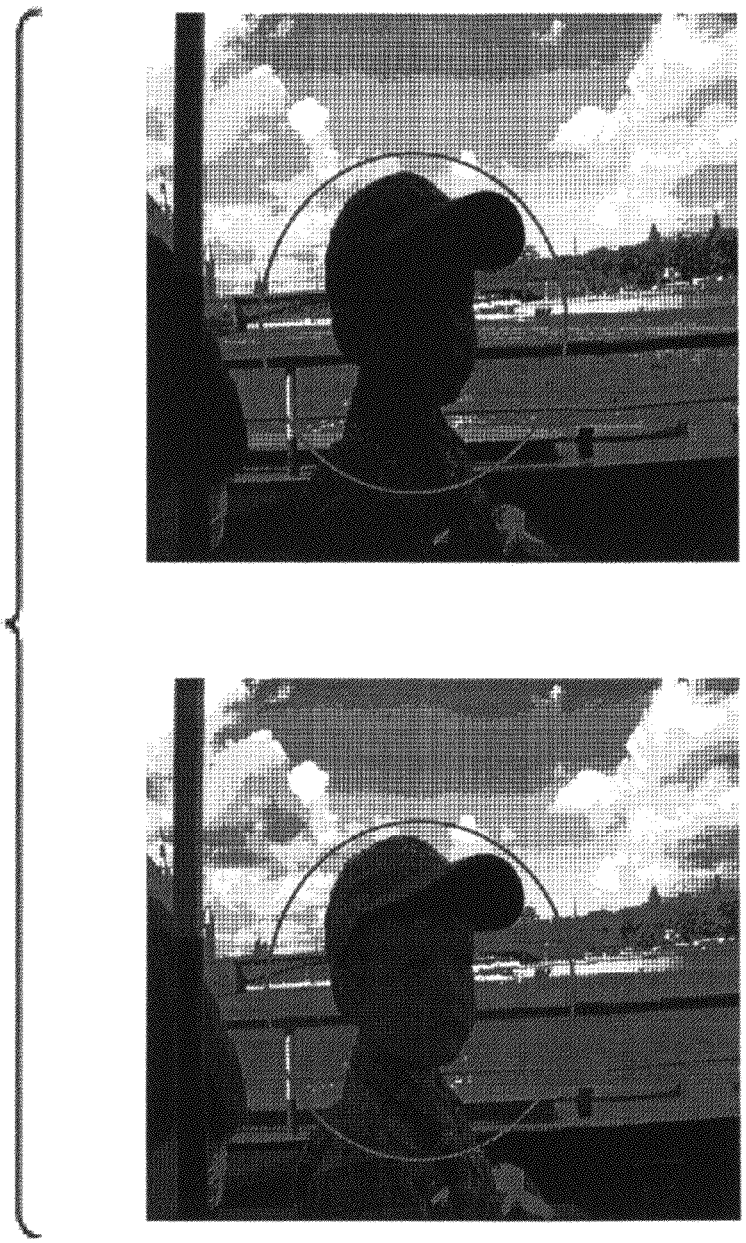
FIG. 7A illustrates a result of a conventional luminance improving technique.
Figure 7B:
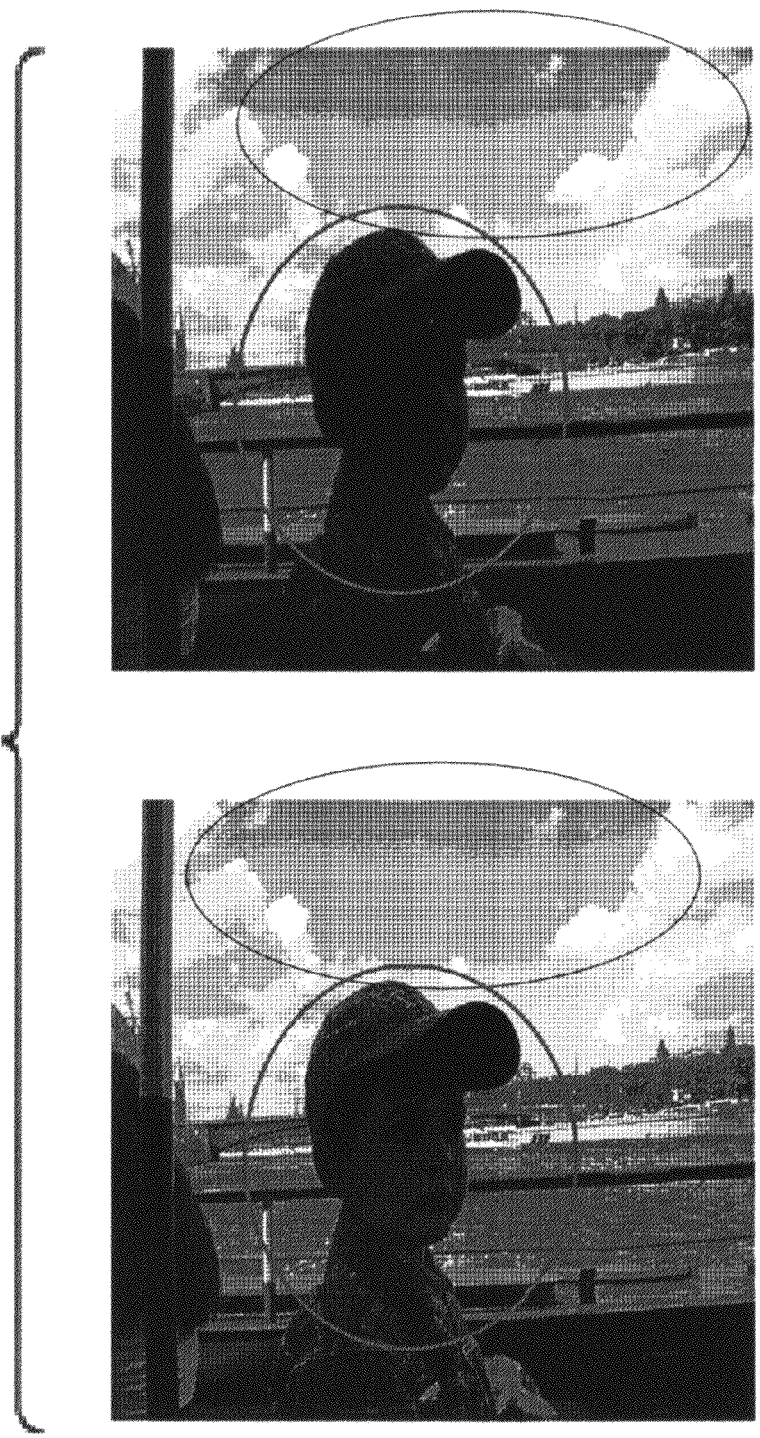
FIG. 7B illustrates a result of a luminance improving process by a shadow area compensating method, according to an embodiment of the invention.

FIG. 7A illustrates a result of a conventional luminance improving process, and FIG. 7B illustrates a result of a luminance improving process by a shadow area compensating method, according to an embodiment of the invention.

Conventionally, in order to improve the luminance of an image, when the luminance of a shadow area was corrected, the extent to which the luminance is improved is determined and then the luminance of the shadow area as a whole image was corrected. When the original image (top illustrated image) is compared to the image with improved luminance (lower illustrated image) in FIG. 7A, the luminance in each shadow area enclosed by the illustrated circle is increased such that the shadow image becomes more clear. However, since the luminance in bright portions outside the circle also are also increased to the same extent as the shadow area, the contrast and clarity of the bright portions of the image are deteriorated.

Meanwhile, according to a shadow area compensating method according to an embodiment of the invention, as shown in FIG. 7B, the luminance of a shadow area enclosed by an illustrated lower circle in the compensated image (lower illustrated image) is considerably improved over the original image (top illustrated image) and the luminance of a shadow area enclosed by an illustrated upper circle in the corresponding compensated image has not changed or is rarely improved compared to the illustrated upper circle in the corresponding original image. Therefore, in a bright portion, the image is maintained, and in a dark portion, the luminance of the image is increased. As a result, it is possible to compensate the local contrast and the clarity of the image.

When a representative luminance is introduced, the luminances of a plurality of pixels having the same input luminance can be differently improved. When T- and G-parameters are selected by the histogram method and an adaptive luminance is obtained, it is possible to improve the luminance considering the brightness and distribution of the whole image.

Figure 8:
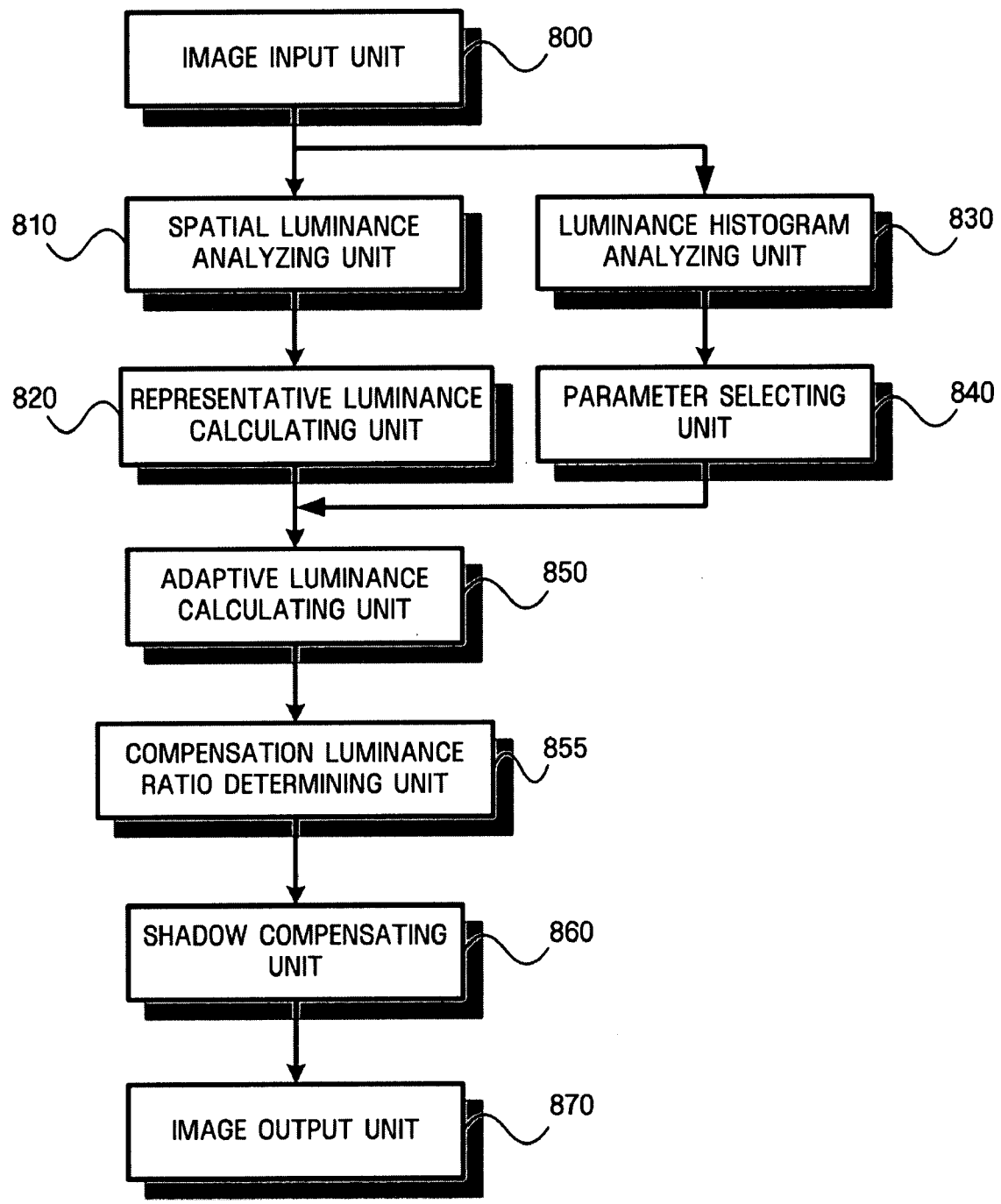
FIG. 8 illustrates a shadow area compensating system, according to an embodiment of the invention.

FIG. 8 illustrates a shadow area compensating system, according to an embodiment of the invention.

The shadow area compensating system may include an image input unit 800, a spatial luminance analyzing unit 810, a representative luminance calculating unit 820, a luminance histogram analyzing unit 830, a parameter analyzing unit 840, an adaptive luminance calculating unit 850, a compensation luminance ratio determining unit 855, a shadow compensating unit 860, and an image output unit 870, for example.

In one embodiment, the image input unit 800 may receive a frame or an image of a video. Such reception of the video may be in the units of images or pixels for an image process, as will be described in greater detail below.

The spatial luminance analyzing unit 810 may divide the input image into a plurality of regions, calculate the average luminance of each of the divided regions, and determine whether the calculated average luminance is lower than a threshold luminance. If at least one of the calculated spatial luminances, that is, the average luminance of the plurality of divided regions, is lower than the threshold luminance, shadow correction may be desired. If not, the shadow correction may not be performed.

The representative luminance calculating unit 820 may calculate the luminance of each pixel using information on the pixels positioned in the vicinity of the corresponding pixel, as a representative luminance. In one embodiment, the representative luminance $L_{av}$ of each pixel may be calculated by averaging the luminances of three-by-three pixels or five-by-five pixels with the corresponding pixel as the center. The representative luminance of each pixel may further be obtained by classifying the pixels positioned in the vicinity of the corresponding pixel and then averaging the luminances of the pixels in one, of which the number of pixels is largest, of the groups.

The luminance histogram analyzing unit 830 may create a histogram representing the luminance distribution for the pixels while scanning the whole image and classify the corresponding image. When the luminance histogram is created, the approximate brightness distribution of the corresponding image may become apparent. Therefore, the image can be classified into one of a plurality of predetermined types according to the approximate distributions and sizes of bright regions and dark regions.

The parameter selecting unit 840 may select T- and G-parameters according to the type of image determined by the luminance histogram analyzing unit, for example. The T-parameter can represent a region for which a representative luminance compensating process is performed, and the G-parameter may be an exponent used in exponentiation with the representative luminance as the base. Therefore, as the T-parameter increases, the representative luminance compensating process is performed for a wider range of luminance. When the G-parameter is more than 1, an adaptive luminance $L_{ad}$ lower than the representative luminance is obtained.

The adaptive luminance calculating unit 850 may calculate the adaptive luminance using the T- and G-parameters. The adaptive luminance may be calculated by substituting the T- and G-parameters and the representative luminance into Equation 4, for example. A graph corresponding to Equation 4 may be, for example, an exponential curve as shown in FIG. 5B. Therefore, as shown in FIG. 5B, in a low-representative-luminance region, the calculated adaptive luminance is lower than the representative luminance, and in a high-representative-luminance region, the calculated adaptive luminance can be the same as or substantially equal to the representative luminance. Therefore, according to an embodiment, the adaptive luminance can be calculated by Equation 4 using the representative luminance.

Here, in this embodiment, the compensation luminance ratio determining unit 855 may determine a compensation luminance ratio using the calculated adaptive luminance or the representative luminance, for example. As the adaptive luminance or the representative luminance increases, the compensation luminance ratio decreases up to about 1. Therefore, in a region in which the representative luminance or the adaptive luminance is high, the luminance is not increased or rarely increased.

The shadow compensating unit 860 may then increase the output luminance by multiplying the input luminance of the pixel by the determined compensation luminance ratio, for example. Therefore, the extent to which the luminance of the corresponding pixel is increased can depend on the compensation luminance ratio.

The image output unit 870 may further calculate the output luminance of each pixel and output the resultant compensated image. Therefore, the pixels with increased luminances may be more brightly output than those of the input image and the pixels of which the luminances has not been increased may be output with the same luminances as those of the input image.

The term "unit," as used herein, can mean, but is not limited to, a software and/or hardware component, such as a Field Programmable Gate Array (FPGA) or an Application Specific Integrated Circuit (ASIC), which performs certain tasks. For example, a unit may advantageously be configured to reside on the addressable storage medium and configured to be executed on one or more processors. Thus, a unit may include, by way of only an example, components, such as software components, object-oriented software components, class components and task components, processes, functions, attributes, procedures, subroutines, segments of program code, drivers, firmware, microcode, circuitry, data, databases, data structures, tables, arrays, and variables. The capability provided by such components and units may be implemented by fewer components and units or implemented by additional components and units. In addition, elements and units may be implemented to be executed on one or more CPUs within a device or to reside on a secure multimedia card.

In this regard, and in addition to the above described embodiments, embodiments of the present invention can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

It is possible to obtain a clear image by improving the luminance of each pixel considering not only the luminance of the corresponding pixel but also the luminances of the pixels positioned in the vicinity of the corresponding pixel.

Further, since the luminance of each pixel reflects the luminances of the pixels positioned in the vicinity of the corresponding pixel, even though a plurality of pixels have the same luminance, it is possible to increase the luminances of pixels of them in a dark portion and to maintain the luminances of pixels of them in portions except for the dark portion.

In addition, since the luminance distribution and the luminance of the whole image are grasped using a histogram and the luminance is corrected to a luminance appropriate to the whole image, it is possible to obtain a wholly clear image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image compensating method, comprising:
    calculating a representative luminance for each pixel of an image based on a luminance of a corresponding pixel and luminances of pixels positioned in a vicinity of the corresponding pixel;
    determining a compensation luminance ratio using the calculated representative luminance;
    increasing an output luminance of at least the corresponding pixel based on the compensation luminance ratio,
    wherein, the compensation luminance ratio decreases as the representative luminance increases, and
    wherein, when calculating the representative luminance, the representative luminance is calculated by calculating luminance differences between the corresponding pixel and the pixels positioned in the vicinity of the corresponding pixel, classifying the luminance differences into two groups according to whether each luminance difference is greater than a threshold luminance, and averaging luminances of pixels in a group, of the two groups, having a greatest number of pixels.

2. The method of claim 1, further comprising dividing the image into a plurality of regions, calculating an average luminance for each of the divided regions, and determining whether a region, of the divided regions, has an average luminance lower than a threshold luminance.

3. The method of claim 1, wherein, when calculating the representative luminance, the representative luminance is calculated by averaging the luminances of the corresponding pixel and the pixels positioned in the vicinity of the corresponding pixel or by assigning weights, reflecting respective distances between the corresponding pixel and the pixels positioned in the vicinity of the corresponding pixel, to luminances of respective pixels positioned in the vicinity of the corresponding pixel and averaging corresponding weighted luminances.

4. The method of claim 1, wherein when determining the compensation luminance ratio, the compensation luminance ratio is represented by $I_{N(x,y)}/Y$ and determined by the following Equation using the representative luminance as represented by $L_{av}$:

$$Y = \left(\frac{I_{N(x,y)}}{\frac{I_{(x,y)}}{L_{av}}+1}\right)\left(1 - \frac{I_{N(x,y)}}{\frac{I_{(x,y)}}{L_{av}}+1}\right) + I_{N(x,y)}^2,$$

where if $(Y>I_{N(x,y)})$ then $Y=I_{N(x,y)}$), $I_{N(x,y)}$ is a normalized value of a luminance of a pixel positioned at coordinates (x, y) of an input image, $I_{(x,y)}$ is the luminance of the pixel positioned at the coordinates (x, y) of the input image, I' is a luminance of the pixel as output, and Y is an improved luminance ratio.

5. The method of claim 4, wherein when increasing an output luminance, the output luminance I' is determined by the following Equation using the compensation luminance ratio:

$$I' = \frac{I_{N(x,y)}}{Y} \cdot I_{(x,y)},$$

where $I_{N(x, y)}$ is the normalized value of the luminance of the pixel positioned at the coordinates (x, y) of the input image, and $I_{(x, y)}$ is the luminance of the pixel positioned at the coordinates (x, y) of the input image.

6. The method of claim 1, further comprising:
    receiving image information including luminance information for at least the corresponding pixel and a luminance of a pixel positioned in the vicinity of the corresponding pixel; and
    outputting through an output unit an output image with at least the increased output luminance of at least the corresponding pixel.

7. A non-transitory computer-readable storage medium comprising computer readable code to control at least one processing element to implement the method of claim 1.

8. An image compensating method, comprising:
    calculating a representative luminance for each pixel of an image based on a luminance of a corresponding pixel and luminances of pixels positioned in a vicinity of the corresponding pixel;
    calculating an adaptive luminance by correlating the representative luminance with an exponential curve;

determining a compensation luminance ratio using the calculated adaptive luminance;

increasing an output luminance of at least the corresponding pixel based on the compensation luminance ratio; and dividing the image into a plurality of regions, calculating an average luminance for each of the divided regions, and determining whether a region, of the divided regions, has an average luminance lower than a threshold luminance, wherein, the compensation luminance ratio decreases as the representative luminance increases.

9. The method of claim 8, wherein when calculating the adaptive luminance, and with the representative luminance being represented by $L_{av}$, the adaptive luminance is represented by $L_{ad}$ and is calculated by forming the exponential curve using the following Equation using T- and G-parameters:

$$\text{if } (L_{av} < T)$$
$$L_{ad} = \left(\frac{L_{av}}{T-1}\right)^G (T-1),$$
$$\text{else}$$
$$L_{ad} = L_{av}$$

with the T-parameter being a maximum value of luminances to be shadow-corrected, and with the G-parameter being an exponent for exponentiation with the representative luminance $L_{av}$ as the base.

10. The method of claim 8, wherein the calculating of the adaptive luminance comprises classifying the image by creating a histogram of the image as a whole.

11. The method of claim 10, wherein the calculating of the adaptive luminance further comprises selecting T- and G-parameters corresponding to the classification of the image.

12. The method of claim 8, wherein when determining the compensation luminance ratio, and with the adaptive luminance being represented by $L_{ad}$, the compensation luminance is represented by ratio $I_{N(x,y)}/Y$ and is determined by the following Equation using the adaptive luminance $L_{ad}$:

$$Y = \left(\frac{I_{N(x,y)}}{\frac{I_{(x,y)}}{L_{ad}}+1}\right)\left(1 - \frac{I_{N(x,y)}}{\frac{I_{(x,y)}}{L_{ad}}+1}\right) + I_{N(x,y)}^2,$$

where if $(Y > I_{N(x,y)})$ then $Y = I_{N(x,y)}$, $I_{N(x, y)}$ is a normalized value of a luminance of a pixel positioned at coordinates (x, y) of an input image, $I_{(x, y)}$ is the luminance of the pixel positioned at the coordinates (x, y) of the input image, I' is a luminance of the pixel as output, and Y is an improved luminance ratio.

13. The method of claim 12, wherein when increasing an output luminance, the output luminance I' is determined by the following Equation using the compensation luminance ratio:

$$I' = \frac{I_{N(x,y)}}{Y} \cdot I_{(x,y)},$$

where $I_{N(x, y)}$ is the normalized value of the luminance of the pixel positioned at the coordinates (x, y) of the input image, and $I_{(x, y)}$ is the luminance of the pixel positioned at the coordinates (x, y) of the input image.

14. The method of claim 8, further comprising:

receiving image information including luminance information for at least the corresponding pixel and a luminance of a pixel positioned in the vicinity of the corresponding pixel; and outputting through an output unit an output image with at least the increased output luminance of at least the corresponding pixel.

15. A non-transitory computer readable storage medium comprising computer readable code to control at least one processing element to implement the method of claim 8.

16. An image compensating system including at least one processor and at least one memory coupled to the least one processor, the image compensated system comprising:

a representative luminance calculating unit to calculate a representative luminance for each pixel of an image based on a luminance of a corresponding pixel and luminances of pixels positioned in a vicinity of the corresponding pixel;

a compensation luminance ratio determining unit to determine a compensation luminance ratio using the calculated representative luminance;

a shadow compensating unit to increase an output luminance of at least the corresponding pixel based on the compensation luminance ratio; and a spatial luminance analyzing unit to divide the image into a plurality of regions, calculate an average luminance for each of the divided regions, and determine whether a region, of the divided regions, has an average luminance lower than a threshold luminance, wherein, the compensation luminance ratio decreases as the representative luminance is increases.

17. The system of claim 16, wherein the representative luminance calculating unit calculates the representative luminance by averaging luminances of the corresponding pixel and the pixels positioned in the vicinity of the corresponding pixel or by assigning weights, reflecting respective distances between the corresponding pixel and the pixels positioned in the vicinity of the corresponding pixel, to luminances of respective pixels positioned in the vicinity of the corresponding pixel and averaging corresponding weighted luminances.

18. The system of claim 16, wherein the representative luminance calculates unit calculating the representative luminance by calculating luminance differences between the corresponding pixel and the pixels positioned in the vicinity of the corresponding pixel, classifying the luminance differences into two groups according to whether each luminance difference is greater than a threshold luminance or not, and averaging luminances of pixels in a group, of the two groups, having a greatest number of pixels.

19. The system of claim 16, wherein the compensation luminance ratio determining unit determines the compensation luminance ratio is represented by $I_{N(x, y)}/Y$ and by the following Equation using the representative luminance as represented by $L_{av}$:

$$Y = \left(\frac{I_{N(x,y)}}{\frac{I_{(x,y)}}{L_{av}}+1}\right)\left(1 - \frac{I_{N(x,y)}}{\frac{I_{(x,y)}}{L_{av}}+1}\right) + I_{N(x,y)}^2,$$

where if $(Y>I_{N(x,y)})$ then $Y=I_{N(x,y)}$, $I_{N(x,y)}$ is a normalized value of a luminance of a pixel positioned at coordinates (x, y) of an input image, $I_{(x,y)}$ is the luminance of the pixel positioned at the coordinates (x, y) of the input image, I' is a luminance of the pixel as output, and Y is an improved luminance ratio.

20. The system of claim 19, wherein the shadow compensating unit determines the output luminance I' by the following Equation using the compensation luminance ratio:

$$I' = \frac{I_{N(x,y)}}{Y} \cdot I_{(x,y)},$$

where $I_{N(x,y)}$ is the normalized value of the luminance of the pixel positioned at the coordinates (x, y) of the input image, and $I_{(x,y)}$ is the luminance of the pixel positioned at the coordinates (x, y) of the input image.

21. The system of claim 16, further comprising:
an image input unit to receive image information including luminance information for at least the corresponding pixel and a luminance of a pixel positioned in the vicinity of the corresponding pixel; and
an image output unit to output an output image with at least the increased output luminance of at least the corresponding pixel.

22. An image compensating system including at least one processor and at least one memory coupled to the at least one processor, the image compensating system comprising:
a representative luminance calculating unit to calculate a representative luminance for each pixel of an image based on a luminance of a corresponding pixel and luminances of pixels positioned in a vicinity of the corresponding pixel;
an adaptive luminance calculating unit to calculate an adaptive luminance by correlating the representative luminance with an exponential curve;
a compensation luminance ratio determining unit to determine a compensation luminance ratio using the calculated adaptive luminance;
a shadow compensating unit to increase an output luminance of at least the corresponding pixel based on the compensation luminance ratio; and
a spatial luminance analyzing unit to divide an input image into a plurality of regions, calculate an average luminance for each of the divided regions, and determine whether a region, of the divided regions, has an average luminance lower than a threshold luminance,
wherein, the compensation luminance ratio decreases as the representative luminance increases.

23. The system of claim 22, wherein, with the representative luminance being represented by $L_{av}$, the adaptive luminance calculating unit calculates the adaptive luminance represented by $L_{ad}$ by forming the exponential curve using the following Equation using T- and G-parameters:

if $(L_{av} < T)$ $$L_{ad} = \left(\frac{L_{av}}{T-1}\right)^G (T-1)$$

else $$L_{ad} = L_{av},$$

with the T-parameter being a maximum value of luminances to be shadow-corrected, and
with the G-parameter being an exponent for exponentiation with the representative luminance $L_{av}$ as the base.

24. The system of claim 22, wherein the adaptive luminance calculating unit comprises a histogram analyzing unit to classify the image by creating a histogram of the image as a whole.

25. The system of claim 24, wherein the adaptive luminance calculating unit further comprises a parameter selecting unit selecting T- and G-parameters corresponding to the classification of the image.

26. The system of claim 22, wherein, with the adaptive luminance being represented by $L_{ad}$, the compensation luminance ratio determining unit determines the compensation luminance ratio represented by $I_{N(x,y)}/Y$ by the following Equation using the adaptive luminance $L_{ad}$:

$$Y = \left(\frac{I_{N(x,y)}}{\frac{I_{(x,y)}}{L_{ad}}+1}\right)\left(1 - \frac{I_{N(x,y)}}{\frac{I_{(x,y)}}{L_{ad}}+1}\right) + I_{N(x,y)}^2,$$

where if $(Y>I_{N(x,y)})$ then $Y=I_{N(x,y)}$, $I_{N(x,y)}$ is a normalized value of a luminance of a pixel positioned at coordinates (x, y) of an input image, $I_{(x,y)}$ is the luminance of the pixel positioned at the coordinates (x, y) of the input image, I' is a luminance of the pixel as output, and Y is an improved luminance ratio.

27. The system of claim 26, wherein the shadow compensating unit determines the output luminance I' by the following Equation using the compensation luminance ratio:

$$I' = \frac{I_{N(x,y)}}{Y} \cdot I_{(x,y)},$$

wherein $I_{N(x,y)}$ is the normalized value of the luminance of the pixel positioned at the coordinates (x, y) of the input image, and $I_{(x,y)}$ is the luminance of the pixel positioned at the coordinates (x, y) of the input image.

28. The system of claim 22, further comprising:
an image input unit to receive image information including luminance information for at least the corresponding pixel and a luminance of a pixel positioned in the vicinity of the corresponding pixel; and
an image output unit to output an output image with at least the increased output luminance of at least the corresponding pixel.

* * * * *

UNITED STATES PATENT AND TRADEMARK OFFICE
CERTIFICATE OF CORRECTION

PATENT NO. : 8,155,474 B2
APPLICATION NO. : 11/822729
DATED : April 10, 2012
INVENTOR(S) : Young-ran Han et al.

It is certified that error appears in the above-identified patent and that said Letters Patent is hereby corrected as shown below:

In the Claims:

Column 15; Line 50 (Approx.); In Claim 12, delete "Y" and insert -- (Y --, therefor.
Column 17; Line 1; In Claim 19, delete "Y" and insert -- (Y --, therefor.
Column 18; Line 33 (Approx.); In Claim 26, delete "Y" and insert -- (Y --, therefor.

Signed and Sealed this
Fourteenth Day of May, 2013

Teresa Stanek Rea
*Acting Director of the United States Patent and Trademark Office*